Dec. 31, 1963 H. DOUNDOULAKIS 3,116,363
TELEVISION COMMUNICATION SYSTEM
Filed July 20, 1960 5 Sheets-Sheet 1

INVENTOR.
Helias Doundoulakis
BY
Michael S. Striker
Attorney

TELEVISION COMMUNICATION SYSTEM

Filed July 20, 1960 5 Sheets-Sheet 2

INVENTOR.
Helias Doundoulakis
BY
Michael S. Striker
Attorney

INVENTOR.
Helias Doundoulakis
BY
Michael S. Striker
Attorney

INVENTOR.
Helias Doundoulakis
BY
Michael S. Striker
Attorney

TELEVISION COMMUNICATION SYSTEM

Filed July 20, 1960 5 Sheets-Sheet 5

INVENTOR.
Helias Doundoulakis
BY
Michael S. Striker
Attorney 3,116,363
TELEVISION COMMUNICATION SYSTEM
Helias Doundoulakis, Brooklyn, N.Y., assignor to Teleglobe Pay-TV-System, Inc., New York, N.Y.
Filed July 20, 1960, Ser. No. 44,180
12 Claims. (Cl. 178—5.1)

The present invention relates to a television communication system. More particularly, the invention relates to a television communication system which provides for secret transmission of video and audio signals.

The principal object of the present invention is the provision of a secret television communication system.

An object of the present invention is the provision of a television communication system which may be utilized for normal transmission or for secret transmission.

Another object of the present invention is the provision of a secret television communication system adapted to utilize existing transmitting and receiving equipment without the necessity of expensive or extensive modification of such equipment.

Another object of the present invention is the provision of a secret television communication system providing for the removal of a selected synch signal before transmission from the transmitter and the reinstatement of the selected synch signal after detection at the receiver.

Another object of the present invention is the provision of a secret television communication system providing for transmission of a video signal without a selected synch signal without disturbing normal transmitter operation.

Another object of the present invention is the provision of a secret television communication system utilizing simple means for providing a video signal for transmission without a selected synch signal.

Another object of the present invention is the provision of a secret television communication system utilizing the suppression of the horizontal synch signal for providing a distorted picture.

Another object of the present invention is the provision of a secret television communication system utilizing simple means for reinstating a non-transmitted selected synch signal.

Another object of the present invention is the provision of a secret television communication system utilizing production of the horizontal synch signals at the receiver for reinstating a distorted picture.

Another object of the present invention is the provision of a secret television communication system providing for reinstatement of a distorted picture without disturbing normal receiver operation.

Another object of the present invention is the provision of a secret television communication system which entails simple connection of the encoding and decoding components to existing equipment with a minimum of inconvenience to the user or subscriber and to the transmitting station.

Another object of the present invention is the provision of a secret television communication system utilizing decoding means connected between the antenna and the receiving means of the receiver.

Still another object of the present invention is the provision of a secret television communication system which is reliable and efficient, although of simple structure, in operation.

In accordance with the present invention, the television system comprises transmitting means for transmitting a video signal, the transmitting means including transmitter audio means for simultaneously transmitting an audio signal of a frequency within the audible frequency range synchronized with the video signal. Transmitter encoding means suppresses horizontal synchronizing signals and replaces the horizontal synchronizing signals with a key signal so as to distort the picture, the key signal comprising a substantially sinusoidal waveshape of a predetermined frequency and amplitude modulated on a key signal carrier. Receiving means receive and reproduce the audio signal in synchronism with the video signal and receiver decoding means reconstitutes the horizontal synchronizing signal from the received key signal so as to nullify the effect of the encoding means and provide in the receiving means a video signal including the horizontal synchronizing signals.

In a preferred embodiment of the invention, the decoding means has an input connected to the antenna of the receiving means and an output connected to the receiving means itself, and comprises means for deriving the substantially sinusoidal key signal from the key signal carrier, waveshaping means for converting the substantially sinusoidal key signal into horizontal synchronizing pulses, modulating means for modulating the received video signal with the horizontal synchronizing pulses to provide a resultant video signal, and means for applying the resultant video signal and a received audio signal to the receiving means.

In order that the present invention may be readily carried into effect, it will now be described with reference to the accompanying drawings, wherein.

The circuitry and/or components of any of the blocks shown in FIGS. 3, 4, 5 and 6 is well known in the art and is fully shown and described in any suitable textbook on television or communication engineering, such as for example, "Principles of Television Engineering," by Donald G. Fink, McGraw-Hill Book Co., Inc. 1940, or "Radio Engineering Handbook," Keith Henney, Editor-in-Chief, 4th edition, McGraw-Hill Book Co., Inc., 1950, chapter 19, on Television, by Donald G. Fink, pages 995 to 1050.

The geometric fidelity of the reproduction of the picture in a TV system depends upon the exact correspondence in position of the scanning spot at the transmitter and receiver. This correspondence requires that the periodicity and phasing of the horizontal and vertical scanning motions at the two termini, that is, at the transmitter and at the receiver of the television communication system, be alike. Suitable signals are transmitted which indicate the beginning of each frame (or field repetition the in the case of interlaced scanning) and the beginning of each line. These synchronizing signals are part of the complete video signal, and occur during time not utilized by the picture signal itself, that is, during the interval in which the scanning spot is returning to its original position, after completing a line or field transversal. In terms of the frequency spectrum of the picture signal, the frequency components are multiples of line and frame frequency, their phase and amplitude being such that they have no effect on the picture except around the edges where they form a narrow border which cannot be used for the image and which, in cathode ray terminal tubes, has no real existence.

Scanning in the case of electronic terminal tubes is produced by deflecting an electron stream periodically in two mutually perpendicular directions by means of suitably varying magnetic or electrostatic fields. The current or voltage producing these fields is supplied from two deflection generators, one operating at line frequency, the other at frame or field frequency. Each generator is controlled by its own synchronizing impulse; therefore, the complete signal must include two types which can be distinguished from one another by some form of selector circuit. It is usual to make the generator producing the synchronizing impulses at the transmitter the fundamental timing unit of the entire system. Thus, the synchronizing signal governs not only the scanning pattern at the reproducer, but also that at the pickup as well. The exact shape of the impulses for horizontal and vertical synchronizing depends upon how the signal is applied at the deflection generator and upon the circuits which separate the two components. Experience has prompted the almost universal adoption of synchronizing impulses which are "blacker than black," that is, the blanking level corresponds to black in the video signal and the impulses extend below this level in the direction of black.

Figure 1:
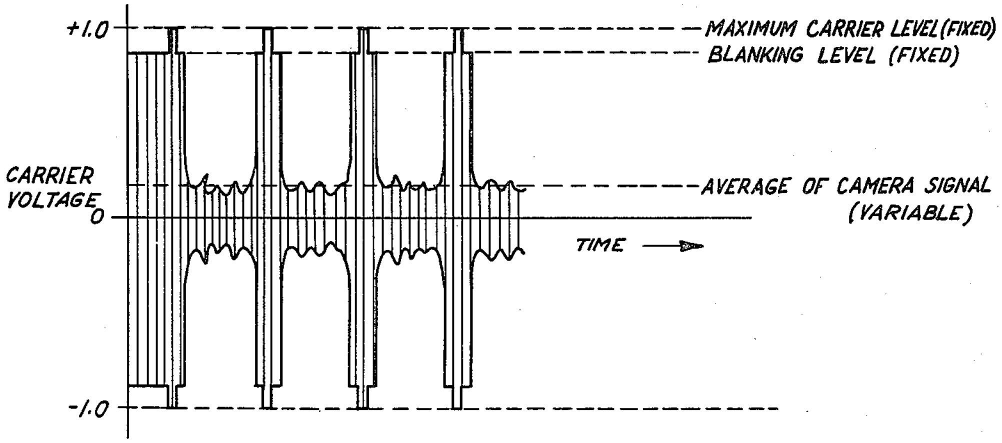
FIG. 1 is a graphical presentation of a modulated TV carrier signal clearly indicating the horizontal synchronizing pulses.
Figure 2:
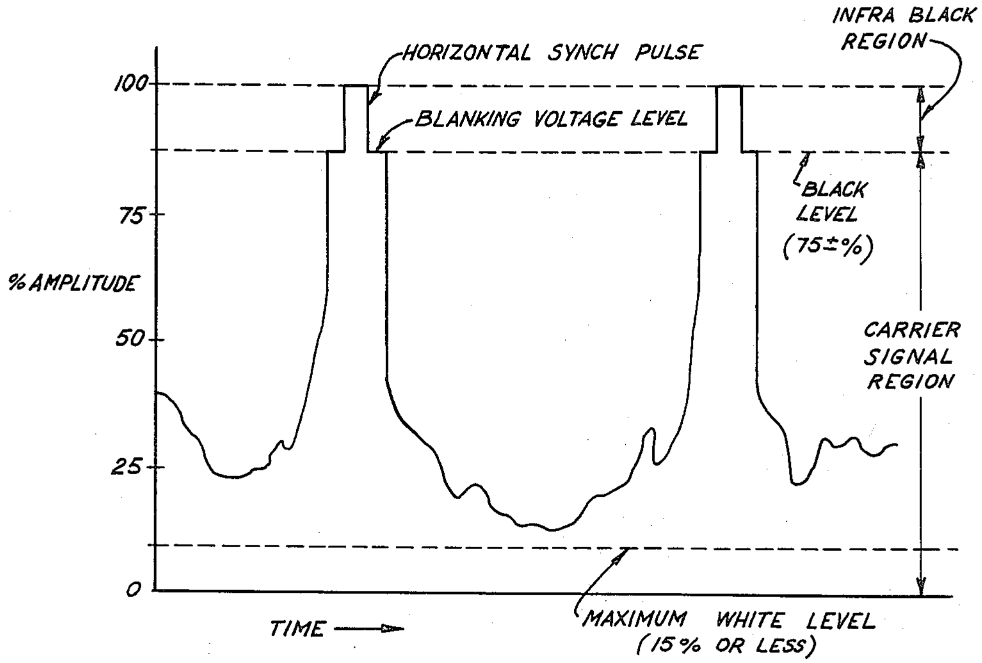
FIG. 2 is a graphical presentation of the details of the modulation envelope of a TV carrier signal clearly indicating the horizontal synchronizing pulses.

The standard form of horizontal synchronizing pulse is shown in FIGS. 1 and 2. The function of the horizontal synchronizing pulses is to trigger an oscillator in order to bring the electron stream from the right-hand side of the screen to the left-hand side. Once the beam is on the left-hand side, the oscillator is no longer directly under the control of a pulse and goes about its usual function of sweeping the beam across the screen. Thus, each horizontal synchronizing pulse that precedes the line detail sets up the beam in readiness for the scanning out of this information. The next pulse arrives when the beam is at the far right-hand side of the screen, at the very end of the line. In similar manner, the vertical pulses serve the purpose of bringing the electron beam back to the top of the screen for the beginning of each field. The construction of the video signal is clearly shown with its synchronizing pulses in FIGS. 1 and 2. In FIGS. 1 and 2, several lines of an image are shown complete with the detailed information, blanking voltages, and horizontal synchronizing pulses. The blanking and synchronizing voltages occupy approximately 20% to 25% of the total signal amplitude. Notice that the blanking voltage retains its control over the cathode ray tube gride for some time before and after each horizontal synchronizing pulse. This is done to make certain that no beam retrace is visible at all on the screen. As soon as the blanking voltage retains control of the grid, the line detail becomes active once more. All the lines of one field follow this form, the only difference occurring in the camera detail of the various sections of the image. At the end of the last horizontal line it is necessary to insert a vertical impulse that will bring the beam back to the top of the screen again. During the period that the vertical pulse is active, it is imperative that the horizontal oscillator should not be neglected. For, should this occur, the horizontal generator probably would slip out of synchronization. To avoid this occurrence, the horizontal synchronizing impulses are sent with the vertical pulse.

When the video signal is imposed on a carrier wave, the envelope of the modulated carrier wave constitutes the video signal wave form. Such a modulated picture carrier and the details of the envelope are shown in FIG. 1. In the FCC standard video signal, as shown in FIGS. 1 and 2, the carrier amplitude is divided by the blank level (blanking level or pedestal) at 75 ±2.5% of the maximum amplitude. The amplitude region above the black level is called the infrablack region and is occupied by the synchronizing signals. Signal levels in this region do not produce light in the received image. The synchronizing signals are of two types: horizontal signals for initiating the motion of the scanning agent along each horizontal line, and vertical signals (not shown in the figures) for initiating the motion of the scanning agent vertically at the beginning of each field. The peak amplitude of the wave, the height of the synchronizing pulses, and the black level amplitude are maintained constant throughout each broadcast. The portion of the carrier envelope extending below the black level is called the camera signal. The polarity of transmission in the FCC standard is negative; that is, an increase in the light on the camera plate results for example in a decrease in the carrier amplitude as shown in FIGS. 1 and 2. The maximum white level is 15% or less of the maximum carrier amplitude. Intermediate grey tones exist between the maximum white level and the black level.

Figure 3:
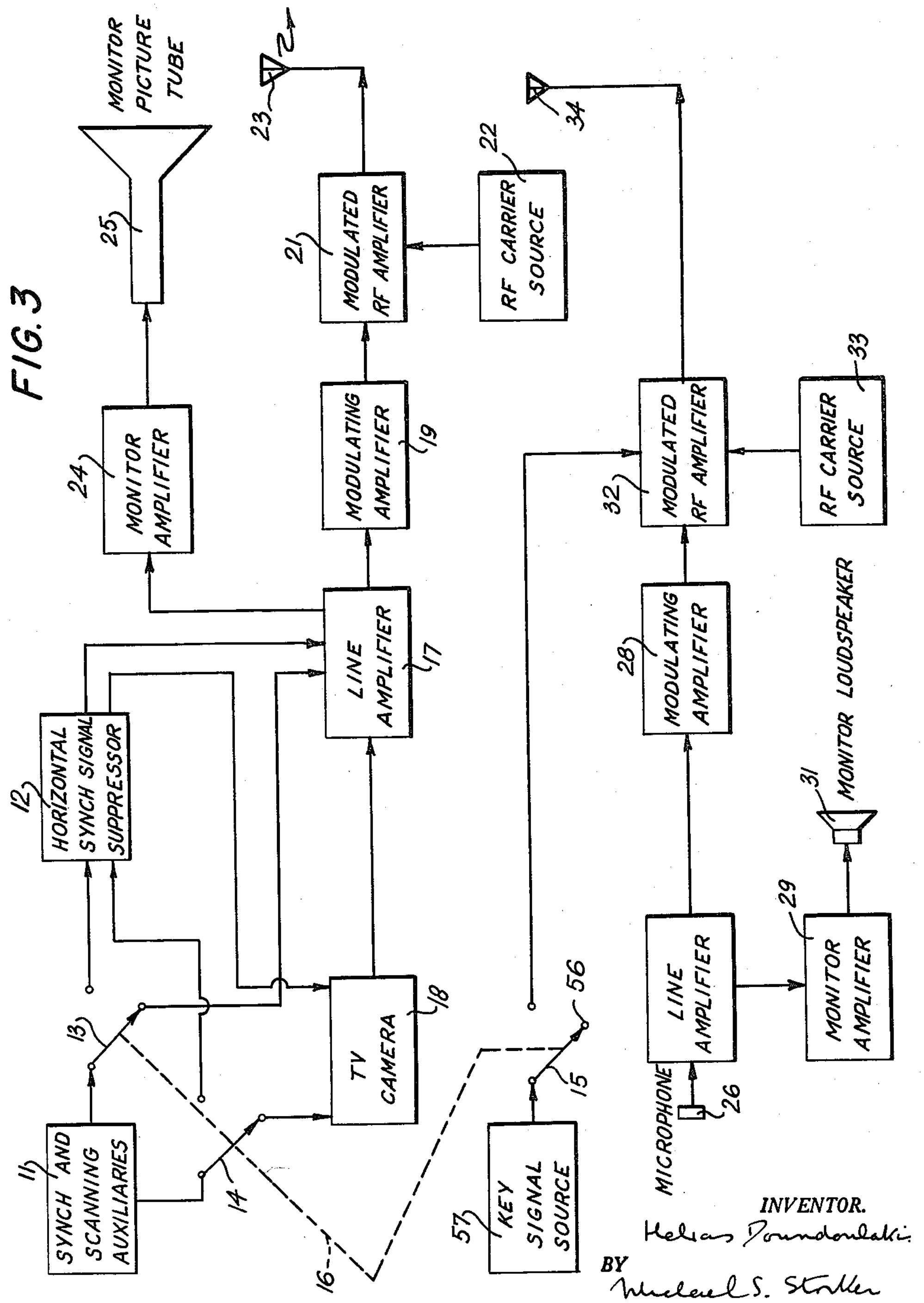
FIG. 3 is a schematic circuit block diagram of an embodiment of a transmitting station of the television communication system of the present invention.

In FIG. 3, synch and scanning auxiliaries 11 produce an output which comprises horizontal and vertical synchronizing signals. The horizontal synchronizing signals produced by the synch and scanning auxiliaries 11 are suppressed in a horizontal synch signal suppressor 12, when so desired, by switch means comprising first and second armatures 13 and 14, respectively. The switch means comprises, besides the first and second armatures 13 and 14, a third armature 15, all three armatures being ganged, as indicated by the dotted lines 16 so that they operate in unison and so that each is in one of two positions at one time and each is in the other of the two positions at another time.

Thus, during normal transmission of the video signal, without picture distortion, the first armature 13 is moved by manual operation of the switch means to a position whereby the synch and scanning auxiliaries 11 is directly connected to a line amplifier 17. The second armature 14 of the switch means is, when the first armature 13 connects the synch and scanning auxiliaries 11 to the line amplifier 17, in a position wherein it connects said synch and scanning auxiliaries to a TV camera 18. Thus, the video signal produced by the line amplifier 17 is amplified by a modulating amplifier 19 and is modulated by a modulated RF amplifier 21 on a suitable carrier produced by an RF carrier source 22 and the modulated video signal is then transmitted by means of antenna 23. During the normal transmission of a normal video signal the horizontal synch signal suppressor 12 is not connected into the transmitting circuit and does not affect its normal operation.

A monitor amplifier 24 produces an output which is fed to a monitor picture tube 25 which reproduces the picture seen by the TV camera 18, which picture is presumably reproduced at the receiver.

A microphone 26 picks up sound and produces an output which is fed to a line amplifier 27. The line amplifier 27 produces an audio signal which is fed to a modulating amplifier 28 and to a monitor amplifier 29. The output of the monitor amplifier 29 is fed to a monitor loudspeaker 31 which reproduces the sound picked up by the microphone and which is presumably reproduced by the loudspeaker at the receiver. The modulating amplifier 28 produces an audio signal which is fed to a modulated RF amplifier 32 which receives a carrier from an RF carrier source 33 and which modulates said carrier with said audio signal. The modulated audio signal is then transmitted through an antenna 34.

Figure 4:
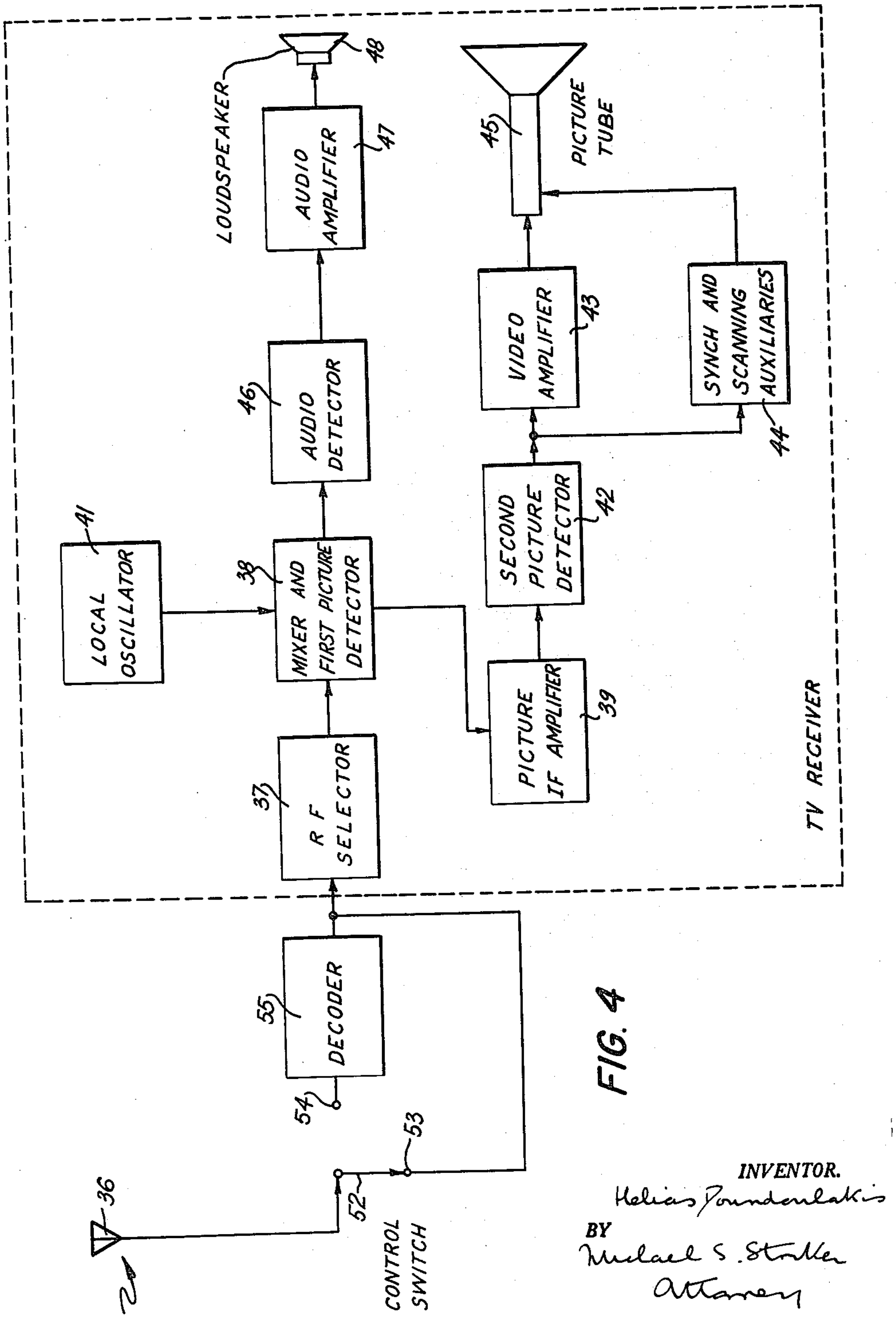
FIG. 4 is a schematic circuit block diagram of an embodiment of a receiving station of the television communication system of the present invention.

The video signal transmitted by the antenna 23 and the audio signal transmitted by the antenna 34, of the transmitting station of FIG. 3 are received by an antenna 36 of the receiving station of FIG. 4 and are applied during normal transmission to a normal receiving set. Thus the received signals are applied to an RF selector 37 which provides an output to a mixer and first picture detector 38. The mixer and first picture detector 38 separates the video and audio signals and applies the video signal to a picture IF amplifier 39. The mixer function is aided by a local oscillator 41 which feeds the mixer and first picture detector 38. The output of the picture IF amplifier 39 is fed to a second picture detector 42. The output of the second picture detector 42 is fed to a video amplifier 43 and to synch and scanning auxiliaries 44 directly. Thus, during normal transmission operation of the system the video amplifier 43 produces an output which is fed to a picture tube 45 of the receiver which reproduces the picture seen by the TV camera 18 of the transmitting station due to the control of said picture tube by the synch and scanning signals produced by the synch and scanning auxiliaries 44.

The audio output of the mixer and first picture detector 38 is fed to an audio detector 46 which produces an output which is fed to an audio amplifier 47. The audio amplifier 47 then feeds a loudspeaker 48 which reproduces the sound originally picked up by the microphone 26 of the transmitter station and transmitted by carrier from the antenna 34 of the transmitting station to the antenna 36 of the receiving station.

Thus, during normal operation of the system of the present invention a video signal containing horizontal and vertical synchronizing pulses or signals and an audio signal will be produced in the usual manner, transmitted in the usual manner and received and reproduced in the usual manner, as described in the aforementioned texts, so that during normal operation of the system of the present invention a normal TV transmission and reception takes place. However, the secret television communication system of the present invention is especially adapted for use as a confidential or closed-type system. The system of the present invention is also adapted for home subscriber programming, and in order to provide such operation the switch means at the transmitting station and the switch means at the receiving station are put into operation.

If a closed-type or subscriber-type system is desired wherein a subscriber wishes to receive a program which is not available to non-subscribers, the subscriber may indicate by phone call or other suitable means, such as for example by dialing a code number, that he wishes to receive a special program. Suitable means may be provided at his receiver for indicating payment for his subscription, such as, for example, a receptacle for coins, tokens, punched cards, etc. The means for payment of the subscription may, by suitable means, also be utilized to notify the transmitting station that the subscriber is ready to receive the special program.

If a subscriber wishes to receive a special program for which he will pay or be billed, has has merely to close a suitable manual switch, such as, for example, a control switch 52 (which is then moved to its position other than that shown in FIG. 4) to permit such reception. Of course, he may indicate in some other suitable manner that he is desirous of receiving a subscription program.

The operation of the switch means at the transmitting station insures that the subscribers receive the program transmitted on a closed circuit basis. Thus, when a special program is to be transmitted, the transmitter control operator will initiate the transmission by operation of the transmitter control or transmitter switch means. The control switch 52 is operated by each paying subscriber to indicate that identified subscribers are ready to receive the special program and have paid their required subscription fees or have been accordingly billed in suitable manner. Such operation of the control switch 52 may be provided directly by coin receiving means, punched card means, or clocking means available at the receiver of the subscriber. The subscriber may, for example, actuate a clock, meter, or recording mechanism, by operating the control switch 52, which clock, meter, or recording mechanism will record his subscription time beginning with the closing of the control switch 52 and/or the initiation of picture reception. At any rate, when the special program is to be transmitted, the operator of the transmitting station operates the switch means to move the first armature 13 to the other position from that shown in FIG. 3, to move the second armature 14 to the other position from that shown in FIG. 3, and to move the third armature 15 to the other position from that shown in FIG. 3 and thereby institute the closed circuit secret television communication system in accordance with the objective of the present invention.

The operation of the control switch 52, which contacts a terminal 53 during normal transmission, from the terminal 53 to a subscription terminal 54 connects a decoder 55 into the circuit. Of course, the control switch 52 may be operated by relay means energized by a control signal received from the transmitter or sent to the receiver in any suitable manner.

When the first armature 13 is moved to its other position from that shown in FIG. 3 and when the second armature 14 is moved to its other position from that shown in FIG. 3, they apply the output of the synch and scanning auxiliaries 11 to the horizontal synch signal suppressor 12 which comprises any suitable type of signal suppressor, such as, for example, a filter which will filter out the horizontal synch signals, or a suitable switch means which will switch the horizontal synch signal generator out of the circuit. The output of the horizontal synch signal suppressor 12 is then supplied to the TV camera 18 and to the line amplifier 17 so that a distorted picture is produced due to the lack of horizontal synch signals. The distorted picture, lacking horizontal synch signals, is then transmitted by the antenna 23. Thus, any non-subscriber, whose receiver is in normal condition, will merely see a distorted garble on his screen instead of a picture. Since the first, second and third armatures 13, 14 and 15 are ganged, so that they move together, the manual operation of a master switch of the transmitter control means will cause all three armatures to move in unison.

The third armature 15 will move from a blank terminal 56, which is contacted by said armature during normal transmission, to its other terminal and thereby cause the key signal produced by a key signal source 57 to be supplied to the modulated RF amplifier 32. The key signal then appears at the antenna 34 as a substantially sinusoidal waveshape of a predetermined frequency modulated on a key signal carrier. The key signal is then supplied to the subscriber's receiver through the antenna 36 of said receiver, so that the subscriber desiring to receive the special program receives said key signal at his set. The key signal carrier may be the audio signal carrier. In a preferred embodiment of the invention, the key signal carrier is that supplied by the RF carrier source 33 and is modulated by the key signal in the modulated RF amplifier 32 and transmitted via the antenna 34.

The key signal is supplied directly to the decoder 55 through the control switch 52, which has been moved to a position in which it contacts the subscription terminal 54.

The key signal may comprise, of course, any suitable frequency and may modulate the audio or video signals, although it is preferably of substantially sinusoidal waveshape. The key signal carrier frequency may lie on either side of the frequency band utilized for video transmission. The key signal preferably had a frequency of 15,750 cycles per second, although it may actually be made to vary from a frequency close to but less than 15,750 cycles per second to a frequency close to but greater than 15,750 cycles per second. The permissible wobbling of the key signal frequency permits greater secrecy in the system of the present invention. The transmission of the key signal in sinusoidal form is preferred because if a nonsinusoidal form is utilized a greater bandwidth will be required and greater bandwidth may conflict with the picture video signal. In the preferred embodiment of the present invention, the key signal comprises a substantially sinusoidal waveshape and is transmitted at a predetermined frequency modulated on the key signal carrier.

Figure 5:
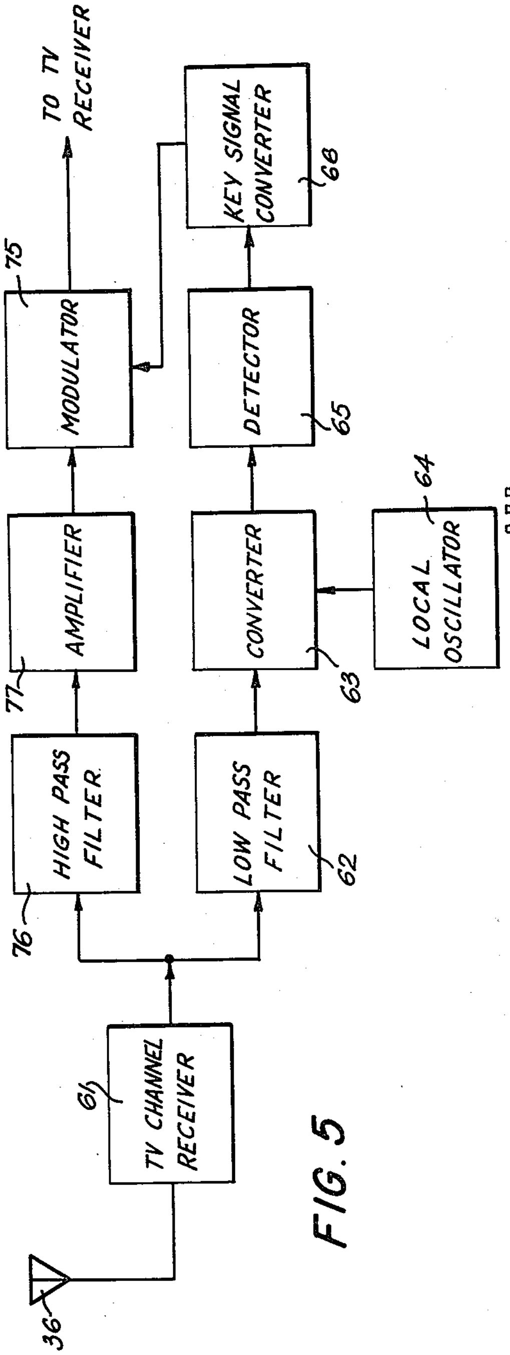
FIG. 5 is a schematic circuit block diagram of an embodiment of decoding means which may be utilized in the embodiment of FIG. 4.

Thus, when the key signal is transmitted through the air and received by the antenna 36, the input of the decoder 55 is connected to said antenna and the output of said decoder is connected to the TV receiver. The decoder 55 comprises suitable means for converting the modulated key signal carrier into horizontal synchronizing pulses. The decoder 55 of the present invention may comprise the system shown in FIG. 5 which shows an embodiment of decoding means which may be utilized in the embodiment of FIG. 4. In the embodiment of FIG. 5, the key signal comprises a substantially sinusoidal waveshape modulated on a key signal carrier. The audio signal and the video signal may be transmitted by air and received by the antenna 36. The video signal, audio signal and the key signal are received by the antenna 36 and are supplied to a TV channel receiver 61 which may comprise any suitable type of TV receiver, such as described in the aforementioned textbooks, and serves to derive from the received signal the video, audio and key signals. The video, audio and key signals derived from the received signal by the TV receiver 61 are then supplied to a low pass filter 62 which derives the key signal modulated key signal carrier from the signal received by the antenna 36. The key signal modulated key signal carrier derived from the low pass filter 62 is then supplied to a converter 63 which converts the key signal modulated key signal carrier to an intermediate frequency with the aid of a local oscillator 64. The IF key signal modulated key signal carrier is then applied to a detector 65 which derives the substantially sinusoidal key signal from the key signal carrier. The key signal derived from the detector 65 is then supplied to a key signal converter 66 which comprises the circuit arrangement of FIGS. 6 and 7 and which functions to convert the substantially sinusoidal key signal into horizontal synchronizing pulses of substantially square waveshape.

Figure 6:
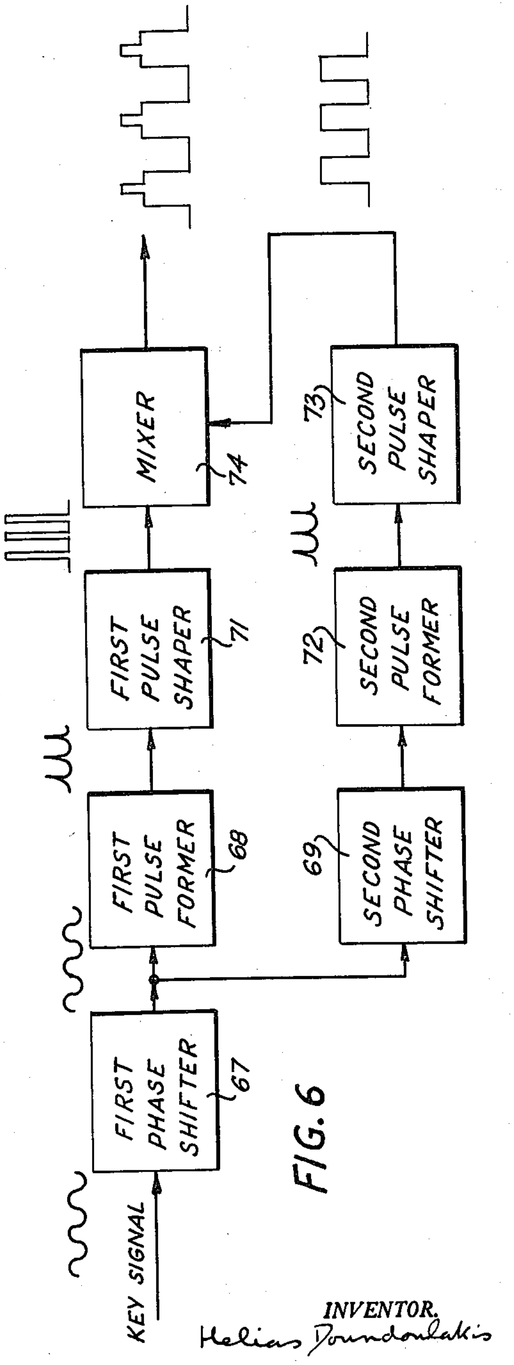
FIG. 6 is a schematic circuit block diagram of an embodiment of key signal converting means which may be utilized in the embodiment of decoding means of FIG. 5.
Figure 7:
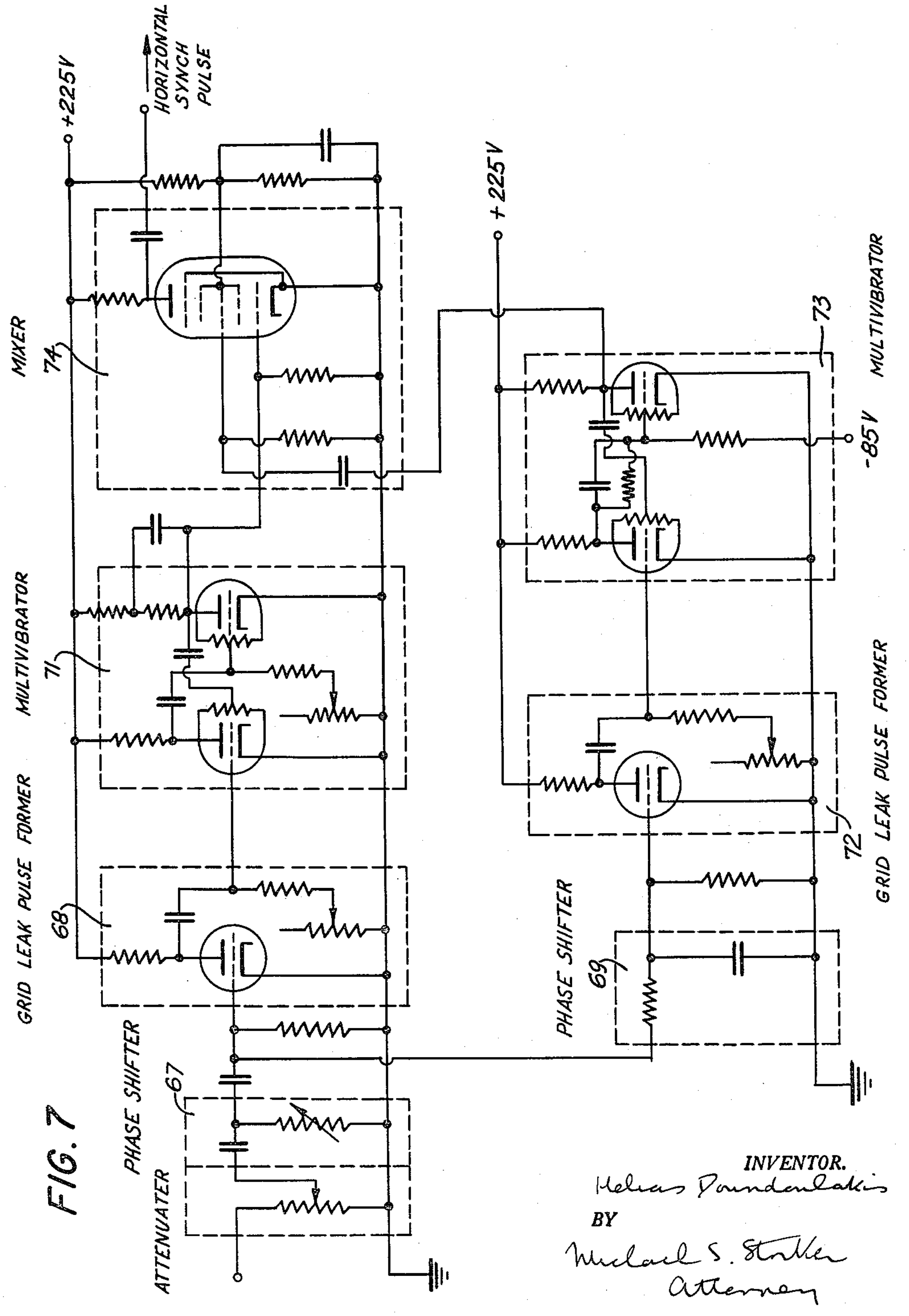
FIG. 7 is a schematic circuit diagram of an embodiment of the key signal converting means of FIG. 6.

The key signal converter 66 of the present invention may comprise the system shown in FIG. 6, wherein the key signal of substantially sinusoidal waveshape is supplied to a first phase shifter 67 which, as shown in FIG. 7, may comprise a simple resistance-capacitance phase shifting network. The first phase shifter 67 is adjusted to shift the incoming key signal to coincide in phase with the vertical synch pulses so that the horizontal synch pulses are coincident or synchronized with the vertical synch pulses. Once the first phase shifter 67 is adjusted for a particular channel it may remain so throughout transmission in such channel. The phase-shifted key signal is then supplied to a first pulse former 68 and to a second phase shifter 69. The first pulse former 68 preferably comprises a grid leak pulse former of the type shown in FIG. 7 and the second phase shifter 69 preferably comprises a simple resistance-capacitance circuit of the type shown in FIG. 7. The first pulse former 68 functions to convert the phase-shifted key signal from substantially sinusoidal waveshape to a first series of substantially sharp pulses. The first series of substantially sharp pulses produced by the first pulse former 68 is then supplied to a first pulse shaper 71, which converts the first series of substantially sharp pulses into a first series of substantially square pulses. The first pulse shaper 71 preferably comprises a multivibrator of the type shown in FIG. 7.

The key signal of substantially sinusoidal waveshape, which has been phase-shifted by the first phase shifter 67 and phase shifted again by the second phase shifter 69, is then supplied to a second pulse former 72 which functions to convert the substantially sinusoidal key signal into a second series of substantially sharp pulses. The second pulse former 72 may be of similar type as the first pulse former 68 and may comprise a grid leak pulse former of the type shown in FIG. 7. The second series of substantially sharp pulses produced by the second pulse former 72 is then supplied to a second pulse shaper 73 which functions to convert the second series of substantially sharp pulses into a second series of substantially sharp pulses into a second series of substantially square pulses. The second pulse shaper 73 may be of similar type as the first pulse shaper 71, as shown in FIG. 7. The substantially square pulses produced by the first and second pulse shapers are designed to differ from each other in duration time and in amplitude so that when both series of pulses are combined they produce a series of horizontal synch signals. Thus, each pulse of the first series of substantially square pulses produced by the first pulse shaper 71 is of relatively greater amplitude and relatively shorter duration than that of each pulse of the second series of substantially square pulses. The first series of substantially square pulses is supplied from the first pulse shaper 71 to a mixer 74 and the second series of substantially square pulses is supplied from the second pulse shaper 73 to said mixer. The mixer 74 may comprise any suitable mixer circuit, such as, for example, a pentagrid mixer of suitable type, as shown in FIG. 7, and functions to combine the first and second series of pulses and produce a resultant series of horizontal synchronizing pulses.

The output of the key signal converter 66 which comprises the horizontal synch signals which were previously suppressed in the transmitter and which were not therefore received at the receiver, is then supplied to a modulator 75. The video, audio and key signals derived from the received signal by the TV receiver 61 are also supplied to a high pass filter 76 which derives the video signal and the audio signal from the signal received by the antenna 36. The video and audio signals are then supplied to the modulator 75 through an amplifier 77. The video signal produced by the high pass filter 76 and the horizontal synch pulses produced by the key signal converter 66 are then combined in the modulator 75 which functions to combine said signals by modulating the video signal with the horizontal synch signal to produce a resultant video signal at its output. The resultant video signal produced by the modulator 75 and the received audio signal are then applied to a TV receiver. Thus, the subscriber enjoys an accurate reproduction at his receiver of the picture and the audio signal and receives a clear and accurate picture and sound as initially originated at the transmitting station.

It is thus seen that the television communication system of the present invention provides security for video and audio transmission to subscribers. Although for the purposes of clarity of illustration and clarity of disclosure a single receiving station is indicated in FIG. 4, it is realized, of course, that a plurality of receiving stations are included in the television communication system of the present invention. Several hundred thousand receiving sets may be included in the system, each of which may include the components of FIG. 4.

It is thus seen that the transmitting station is not disrupted from its normal operation due to the inclusion of the horizonal synch signal suppressor 12 or the control or switch means utilized for the communication system of the present invention and that the receivers are not disrupted from normal operation due to the inclusion of the decoder 55 or key signal converter included in such decoder and the control switch 52. The transmitting and receiving means do not require reconstruction to enable transmission and reception of subscription programs, and neither the owners of TV sets nor the transmitter operator are inconvenienced by the structure or operation of the subscription system. The modifications of existing equipment required for the subscription system are minor ones and include readily installable standard type equipment. The operation of the communication system of the present invention is exceedingly simple, although reliable and efficient.

From the foregoing it will be clear that the present invention comprises not only a secret television communication system, but a method for secret television communication. The method of the present invention comprises the steps of transmitting from a transmitting station a wireless video signal and an audio signal of a frequency within the audible frequency range synchronized with the video signal. The method of the present invention further includes suppressing horizontal synchronizing signals and replacing the horizontal synchronizing signals with a key signal comprising a substantially sinusoidal waveshape of a predetermined frequency modulated on a key signal carrier so as to distort the picture; receiving and reproducing at a receiving station the key signal, the video signal and the audio signal in synchronism with the video signal; and converting the received key signal into substantially square horizontal synchronizing pulses.

The method of the present invention further comprises the steps of receiving at a receiving station the key signal, the video signal and the audio signal in synchronism with the video signal; deriving the key signal from the key signal carrier; converting the key signal into horizontal synchronizing pulses; modulating the received video signal with the horizontal synchronizing pulses to provide a resultant video signal; and applying the resultant video and the received audio signal to picture and audio reproducing means at the receiving station.

It is obvious, of course, that the key signal may be transmitted at any desired frequency in the low frequency range of a standard TV channel, either amplitude modulated or frequency modulated in the key signal carrier so long as it does not interfere with the video or audio signals. The key signal is transmitted as a continuous frequency, utilizing part of the available channel bandwidth; the frequency, phase and relative amplitude of the horizontal synchronizing pulses being indicated thereby.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal wave-shape of a predetermined frequency modulated on a key signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and an output connected to said receiving means and comprising means for deriving said substantially sinusoidal key signal from said key signal carrier, waveshaping means for converting said substantially sinusoidal key signal into horizontal synchronizing pulses and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, means for modulating a received video signal with said horizontal synchronizing pulses to provide a resultant video signal, and means for applying said resultant video signal and a received audio signal to said receiving means.

2. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape of a predetermined frequency modulated on a key signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and an output connected to said receiving means and comprising means for deriving said substantially sinusoidal key signal from said key signal carrier, waveshaping means for converting said substantially sinusoidal key signal into horizontal synchronizing pulses and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substatially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube, means for modulating a received video signal with said horizontal synchronizing pulses to provide a resultant video signal, and means for applying said resultant video signal and a received audio signal to said receiving means.

3. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape of a predetermined frequency modulated on a key signal carrier; receiving means for receiving and reproducing said video signal and said key signal, said receiving means including picture detecting means for deriving the picture signal from an applied signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and an output connected receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

4. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal waveshape of a predetermined frequency modulated on a key signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and a output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, said waveshaping means comprising means for converting said substantially sinusoidal key signal into a series of subtantially sharp pulses and means for converting said series of substantially sharp pulses into a series of substantially square horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

5. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal wave-shape of a predetermined frequency modulated on a key signal carrier; receiving means for receiving and reproducing said video signal and said key signal, said receiving means including picture detecting means for deriving the picture signal from an applied video signal; means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

6. In a television system, in combination, transmitting means for transmitting a video signal, said transmitting means including transmitter audio means for simultaneously transmitting an audio signal of a frequency within the audible frequency range synchronized with said video signal; transmitter encoding means for suppressing horizontal synchronizing signals and replacing said horizontal synchronizing signals with a key signal so as to distort the picture, said key signal comprising a substantially sinusoidal wave-shape of a predetermined frequency modulated on a key signal carrier; receiving means for receiving and reproducing said video signal and said key signal, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for reconstituting said horizontal synchronizing signals from the received key signal so as to nullify the effect of said encoding means and provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

7. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising means for deriving said substantially sinusoidal key signal from said key signal carrier, waveshaping means for converting said substantially sinusoidal key signal into horizontal synchronizing pulses, and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, means for modulating a received video signal with said horizontal synchronizing pulses to provide a resultant video signal, and means for applying said resultant video signal and a received audio signal to said receiving means.

8. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising means for deriving said substantially sinusoidal key signal from said key signal carrier, waveshaping means for converting said substantially sinusoidal key signal into horizontal synchronizing pulses and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube, means for modulating a received video signal with said horizontal synchronizing pulses to provide a resultant video signal, and means for applying said resultant video signal and a received audio signal to said receiving means.

9. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

10. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, said waveshaping means comprising means for converting said substantially sinusoidal key signal into a series of substantially sharp pulses and means for converting said series of substantially sharp pulses into a series of substantially square horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

11. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses, and comprising first phase shifting and pulse forming means for converting said substantially sinusoidal key signal into a first series of substantially sharp pulses, first pulse shaping means for converting said first series of substantially sharp pulses into a first series of substantially square pulses, second phase shifting and pulse forming means for converting said substantially sinusoidal key signal into a second series of substantially sharp pulses, second pulse shaping means for converting said second series of substantially sharp pulses into a second series of substantially square pulses, and mixing means for combining said first and second series of substantially square pulses to provide a resultant series of horizontal synchronizing pulses, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

12. In a television receiver, in combination, receiving means for receiving and reproducing a video signal and a key signal comprising a substantially sinusoidal waveshape of a predetermined frequency modulated on a key signal carrier, said receiving means including picture detecting means for deriving the picture signal from an applied video signal, means connected to said picture detecting means for reproducing a picture from the output of said picture detecting means, synchronizing and scanning means connected to said picture reproducing means, and receiver audio means for receiving and reproducing an audio signal in synchronism with said applied video signal, said receiver audio means comprising audio detecting means for deriving said audio signal from the applied signal and means for reproducing said audio signal from the output of said audio detecting means; antenna means for receiving signals to be applied to said receiving means; and receiver decoding means for producing horizontal synchronizing signals from the received key signal so as to provide in said receiving means a video signal including said horizontal synchronizing signals, said decoding means having an input connected to said antenna means and an output connected to said receiving means and comprising low pass filter means for deriving the key signal modulated key signal carrier from the signal received by said antenna, converting means for converting said key signal modulated key signal carrier to an intermediate frequency, detecting means for deriving said substantially sinusoidal key signal from said key signal carrier, waveshaping means for converting said substantially sinusoidal key signal into horizontal synchronizing pulses and comprising first phase shifting and pulse forming means for converting said substantially sinusoidal key signal into a first series of substantially sharp pulses, said first phase shifting and pulse forming means comprising a resistance-capacitance circuit followed by a grid leak pulse former, first pulse shaping means for converting said first series of substantially sharp pulses into a first series of substantially square pulses, said first pulse shaping means comprising a multivibrator, second phase shifting and pulse forming means for converting said substantially sinusoidal key signal into a second series of substantially sharp pulses, said second phase shifting and pulse forming means comprising a resistance-capacitance circuit followed by a grid leak pulse former, second pulse shaping means for converting said second series of substantially sharp pulses into a second series of substantially square pulses, said second pulse shaping means comprising a multivibrator, and mixing means for combining said first and second series of substantially square pulses to provide a resultant series of horizontal synchronizing pulses, said mixing means comprising a multigrid electron tube, high pass filter means for deriving a video signal and an audio signal from the signal received by said antenna; modulating means for modulating said video signal with said horizontal synchronizing pulses to provide a resultant video signal, and means for applying said resultant video signal and a received audio signal to said receiving means.

References Cited in the file of this patent

UNITED STATES PATENTS

| | | |
|---|---|---|
| 2,570,187 | Aram | Oct. 9, 1951 |
| 2,691,061 | Crotty | Oct. 5, 1954 |
| 2,705,740 | Druz | Apr. 5, 1955 |
| 2,989,580 | Goldsmith | June 20, 1961 |